United States Patent [19]

Yagi et al.

[11] Patent Number: 4,510,606
[45] Date of Patent: Apr. 9, 1985

[54] SILENT DISCHARGE TYPE PULSE LASER DEVICE

[75] Inventors: Shigenori Yagi, Kobe; Masaki Kuzumoto, Amagasaki; Masaaki Tanaka, Nagaokakyo; Shuji Ogawa, Nishinomiya, all of Japan

[73] Assignee: Mitsubishi Denki Kabushiki Kaisha, Tokyo, Japan

[21] Appl. No.: 387,262

[22] Filed: Jun. 9, 1982

[30] Foreign Application Priority Data

Jun. 17, 1981 [JP] Japan ................... 56-93137

[51] Int. Cl.³ ............................... H01S 3/097
[52] U.S. Cl. .................... 372/25; 372/33; 372/38; 372/85
[58] Field of Search ............ 372/25, 38, 85, 86, 372/33, 83

[56] References Cited

U.S. PATENT DOCUMENTS 4,247,829  1/1982  Yagi et al. ............... 372/85
4,329,662  5/1982  Yagi et al. ............... 372/38

OTHER PUBLICATIONS

"Laser Research" vol. 5, No. 3, p. 171, Abstract of Silent Discharge $CO_2$ Laser, Japanese Magazine.

Primary Examiner—James W. Davie
Attorney, Agent, or Firm—Wenderoth, Lind & Ponack

[57] ABSTRACT

A silent discharge type pulse laser device having a pair of opposing electrodes, at least one of which is an electrode covered by a dielectric, which is mounted opposite to a metallic electrode with a silent discharge space in between, a laser resonator consisting of a total reflection mirror and a partial reflection mirror mounted opposite to each other with the silent discharge section in between, a source of high frequency voltage for supplying to the pair of electrodes a high frequency voltage having a predetermined period for silent discharge, and a controller for controlling the high frequency voltage from the source with respect to a first interval and a second interval that form a period longer than the period for silent discharge. The high frequency voltage is supplied to the silent discharge section at a first peak voltage value during the first interval and at a second peak voltage value during the second interval, wherein the second peak voltage value is sufficient to cause a discharge but insufficient to excite laser oscillation.

8 Claims, 15 Drawing Figures

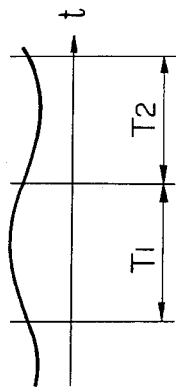
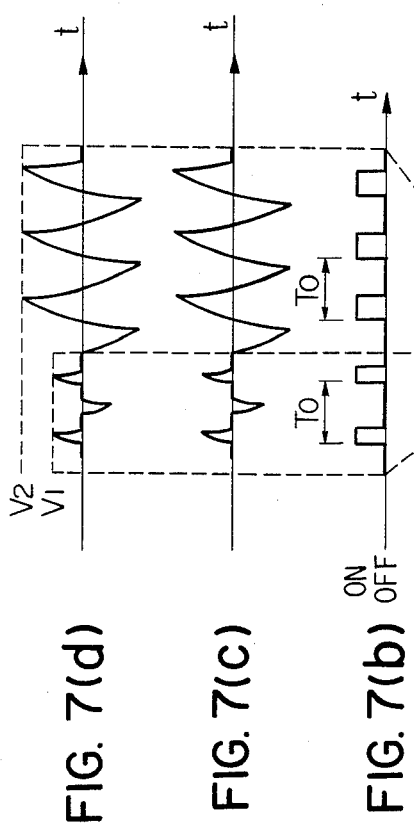
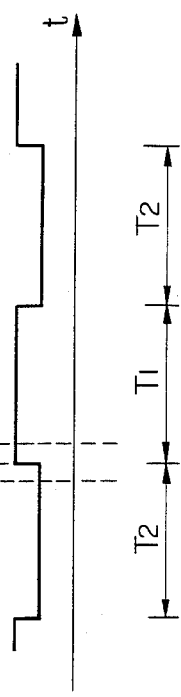
FIG. 7(e)
FIG. 7(d)
FIG. 7(c)
FIG. 7(b)
FIG. 7(a)

4,510,606

SILENT DISCHARGE TYPE PULSE LASER DEVICE

BACKGROUND OF THE INVENTION

This invention relates to a silent discharge type pulse laser device in which the electrical voltage applied to the silent discharge section for exciting the pulse laser has a period longer than the period for silent discharge and has a peak value for a fraction of said period which is sufficient to cause the discharge but insufficient to excite the pulse laser.

FIG. 1 shows a pulse laser device typical of the various devices of the prior art. In this figure, the reference numeral 1 denotes a metallic electrode, and the reference numeral denotes 2 a dielectric electrode (i.e.—an electrode having a dielectric cover) designed to produce silent discharge between it and the metallic electrode 1, and having a metallic part 21 and a dielectric cover 22. The reference numeral 3 denotes a silent discharge section, the reference numeral 4 denotes a transformer, the reference numeral 5 denotes a high frequency source, the reference 6 denotes a total reflection mirror, and the reference numeral 7 denotes a partial reflection mirror forming a laser resonator with the total reflection mirror 6. The reference numerals 8 and 9 denote arrow marks respectively indicating the laser gas and laser output. The laser gas employed is a $Co_2$—$N_2$—He gas mixture with a mol fraction of 5-60-35 and a pressure of about 200 Torr.

The silent discharge pulse lase device operates as follows. When an electrical voltage having a high frequency and amplitude as shown in FIG. 2(a) is applied by the source 5 and transformer 4 across the electrodes 1 and 2, a silent discharge takes place in the space therebetween. The voltage applied is a sinusoidal voltage having a period T0 of 10 μs corresponding to the silent discharge period. This voltage is applied with a peak value V1 equal to 8 kV and for a time interval T1 equal to 0.5 ms, and no voltage is applied for the following period T2 of 0.5 ms. Then, laser oscillation is caused by the laser gas excited by the silent discharge section. Since the duration of the excited laser molecules is about 100 μs, the laser oscillation output has a pulse-like waveform as shown in FIG. 2(b). This laser oscillation output is a series of pulses having a period equal to T1 and T2 and a pulse width Tp shorter than the period T1 and approximately equal to 0.3 ms. The pulse buildup is more gradual than the buildup of the electrical voltage applied for the period T1 because the laser gas is excited in the space of the silent discharge section 3 and it takes some time until the density of excited molecules is raised sufficiently to cause the laser oscillation. With continued operation of the pulse laser, the mean value of the laser oscillation output is decreased gradually as may be noticed from FIG. 2(c) illustrating a marked decrease of the mean output as a result of an operation for several hours.

The reason for such a decrease of the laser oscillation output is now considered by referring to FIG. 3 which shows schematically the discharge space of the silent discharge section 3 from the optical axis of laser light. As is evident from this figure, discharge streaks 32 in the form of silk threads of high brightness are scattered among the uniform glow discharge streaks 31 of deep blue to purple color. These streaks 32 represent a locally pinched discharge with locally elevated values of power density, electron density and gas molecule temperature. It has been shown by the testing and study of changes of gas composition by gas chromatography that, in the case of the occurrence of discharge streaks 32 of higher brightness, the $CO_2$ in the laser gas is decreased abruptly with a passage of time whereas CO and $O_2$ are increased. It may be assumed that the chemical change

takes place in the discharge space in an accelerated manner due to the presence of discharge streaks 32 of higher brightness to cause the decrease in laser oscillation output.

It has also been shown experimentally that, in the case of continued oscillation in the silent discharge section 3, apparition of the streak-like discharge as shown at 32 may be suppressed almost completely and thus the decrease of the laser oscillation output may not be noticed even when the laser device has operated for a prolonged time resulting in the stable laser output continuing for a prolonged time.

However, when a pulse laser oscillation is caused in the silent discharge section 3, there is evidently a certain relationship between the status of discharge occurring in the silent discharge space and the decrease of laser oscillation output. The present inventors were the first to discover and clarify the presence of such a relationship.

Thus, in summary, the prior-art silent discharge type pulse laser has a drawback that, as stated above, the laser output is decreased gradually with a passage of time.

SUMMARY OF THE INVENTION

It is a principal object of the present invention to provide a silent discharge type pulse laser device capable of producing a stable laser output that is not changed substantially with a passage of time.

It is another object of the present invention to provide a silent discharge type pulse laser with a fast buildup speed of the laser oscillation output.

The present invention resides in a silent discharge type pulse laser device, comprising:

a pair of opposing electrodes, at least one of which is an electrode with a dielectric cover thereon, said pair of electrodes having a silent discharge section in between;

a laser resonator consisting of a total reflection mirror and a half reflection mirror mounted opposite to each other with said silent discharge section in between;

a source of high frequency voltage for supplying to said pair of electrodes a high frequency voltage having a predetermined period for a silent discharge;

and a control means for controlling said high frequency voltage from said source with respect to a first interval and a second interval that form a period which is longer than said period for a silent discharge;

wherein said high frequency voltage being supplied to said silent discharge section across said pair of electrodes is at a first peak voltage value during said first interval and at a second peak voltage value during said second interval, said second peak voltage value being sufficient to cause a discharge but insufficient to excite laser oscillation.

BRIEF DESCRIPTION OF THE DRAWINGS

FIGS. 7(a) to (e) are diagrams for explaining the operation of the device shown in FIG. 6.

DESCRIPTION OF THE PREFERRED EMBODIMENTS

Figure 1:
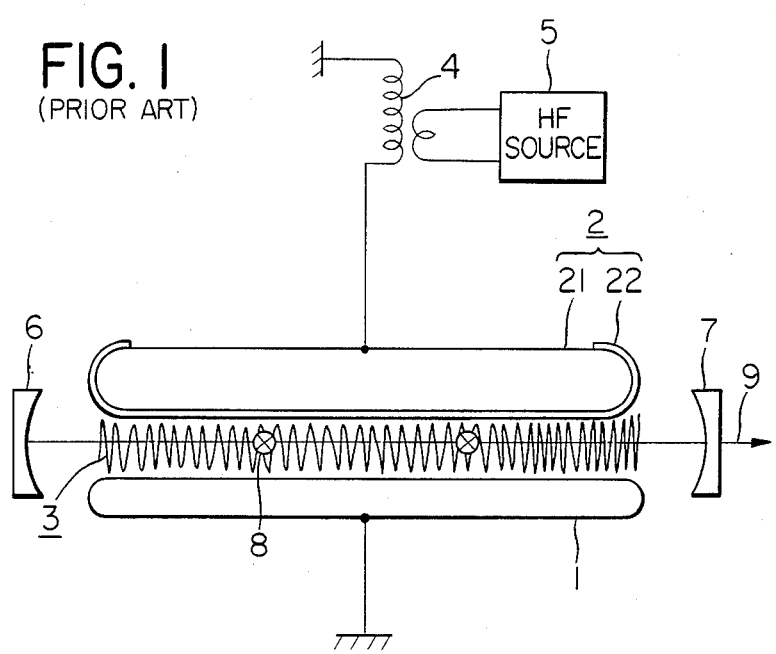
FIG. 1 is a diagram showing a silent discharge type pulse laser device of the prior art.
Figure 2A:
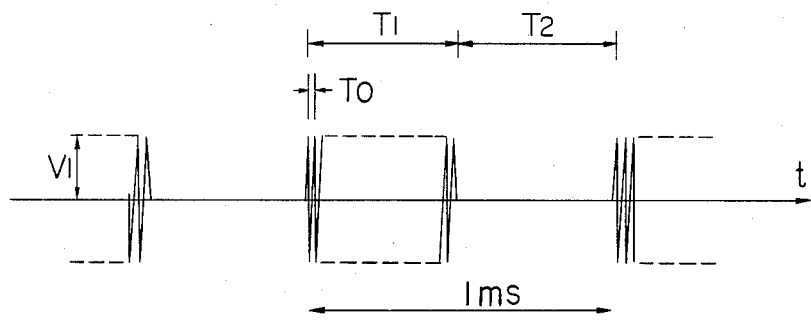
FIGS. 2(a) to (c) show the waveforms at various points of the pulse laser shown in FIG. 1.
Figure 2B:
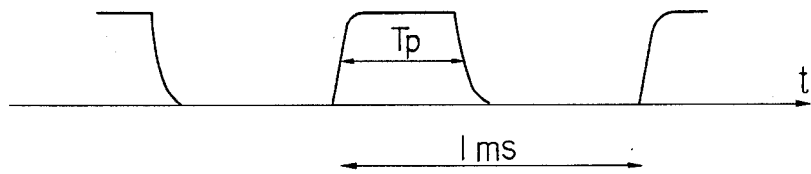
Figure 2C:
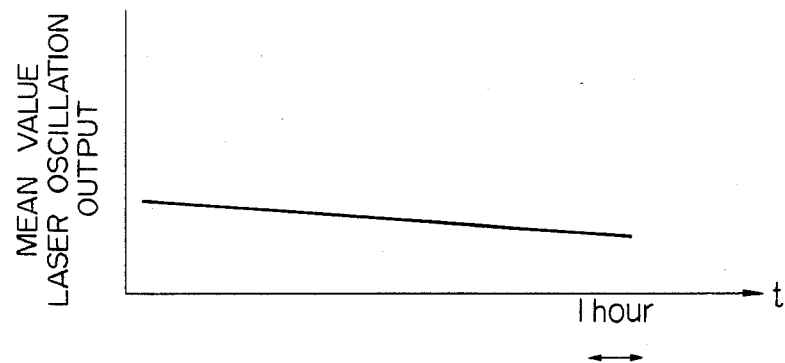
Figure 3:
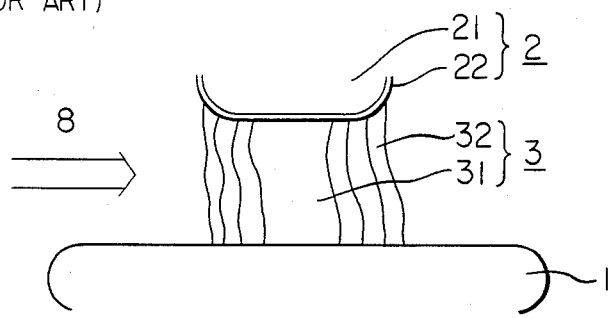
FIG. 3 is a diagram showing the silent discharge section of the pulse laser of FIG. 1 looking in the direction of the optical axis of the laser light.
Figure 4A:
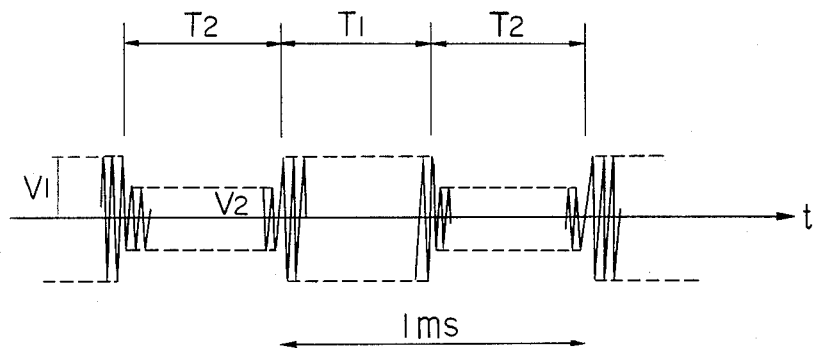
FIGS. 4(a) to (c) show the waveforms at various points of the silent discharge type pulse laser embodying the present invention.

The present invention will be described in detail first by referring to FIGS. 4(a) to (c) which show the waveforms at various points of the pulse laser embodying the present invention. Comparing FIGS. 4(a) to (c) to FIGS. 2(a) to (c), the voltage applied is a high frequency voltage shown in FIG. 4(a) and has a peak value V1 (first voltage peak value) of 8 kV for a period T1 of 0.5 ms (first period) which is a fraction of a period of 1 ms longer than the period of silent discharge, as in the case of FIG. 2(a). However, according to the present invention, a high frequency voltage with a peak value V2 (second voltage peak value) of 3.5 kV is applied for a period T2 of the following 0.5 ms (second period). The high frequency voltage with such a peak value V2 is selected to be sufficient to cause a silent discharge but insufficient to excite laser oscillation. The silent discharge has been confirmed by the present inventors to be in the uniform glow discharge mode. By choosing a voltage value sufficient to cause silent discharge but insufficient to cause laser oscillation means choosing any suitable voltage below the oscillation threshold of 3.8 kV. In FIG. 5, the voltage peak value V is plotted on the horizontal axis and the peak value of the oscillation output is plotted on the vertical axis. The curve of FIG. 5 represents the case wherein a gas mixture $CO_2$—$N_2$—He with a mol fraction 5-60-35 and a pressure of approximately 200 Torr is used as the laser gas and the period of the silent discharge is 100 kHz.

Figure 4B:
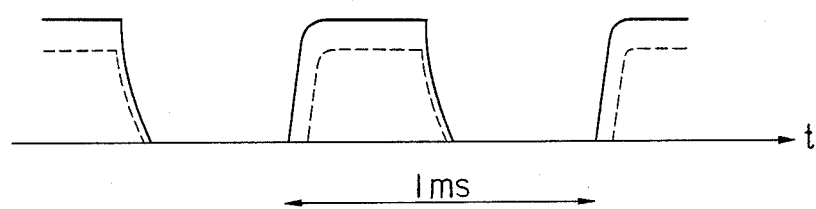
Figure 4C:
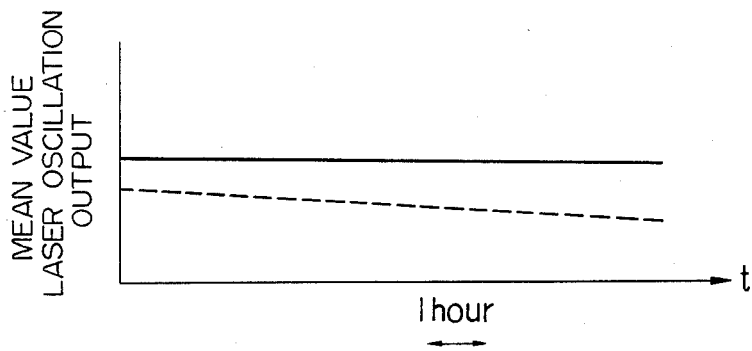
Figure 5:
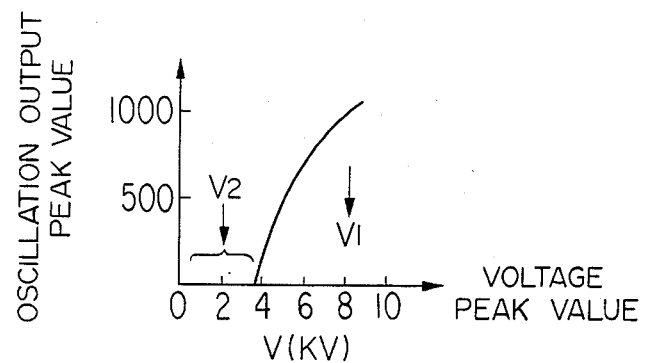
FIG. 5 is a diagram showing the relationship between voltage peak values and the oscillation output peak values.

Referring to FIG. 4(b), the waveform of the laser output obtained by the present invention shown by the solid line covers a larger area than that of the waveform of the prior art shown by the dotted line. FIG. 4(c) shows the mean value of the laser oscillation output. As is evident from this figure, by using the high frequency voltage as shown in FIG. 4(a), the mean value of the laser oscillation output is decreased to a markedly lesser degree than that of the prior art shown by the dotted line and the changes in the laser oscillation output with the passage of time may thus the reduced markedly. This is ascribable to preliminary excitation of the laser gas for the period T2 preceding the period T1 for application of the high frequency voltage, thereby accelerating the buildup of the laser output and enlarging the pulse width. It is a further advantage of the present invention that the laser output of a higher peak value, which could be obtained in the prior-art devices only by increasing the peak value V1 of the high frequency voltage, can now be obtained rather easily and the problem of reaching the dielectric breakdown voltage of the high frequency source 5 and transformer 4 which occur in the prior-art device when increasing the peak value V1 of the high frequency voltage may be avoided.

In the above embodiment, the peak value V2 of the voltage applied for the period T2 has been selected to be sufficient to cause a silent discharge but insufficient to excite laser oscillation. However, this invention may be applied to a case where the peak value is slightly larger and may produce a laser output to a lesser degree. In addition, in the abovenoted embodiment, the high frequency voltage has a rectangular envelope for the period T1+T2; however, the envelope may also be sinusoidal.

The construction and operation for realizing the waveforms shown in FIGS. 4(a) to (c) will be described by referring to FIGS. 6 and 7(a)-(e). In these figures, the reference numeral 1 denotes a metallic electrode, the reference numeral 2 denotes a dielectric electrode, the reference numeral 4 denotes a transformer, the reference numeral 50 denotes a high frequency source and the reference numeral 60 denotes a control means for the source 50.

The high frequency source 50 is so arranged and constructed that the input terminals 52 are connected to a three-phase source (60 Hz, 200 V) is rectified by a rectifier 54, smoothed by a smoothing circuit 56 and processed by an inverter 58 and the resulting output signal is supplied to transformer 4 by way of an inductance 70. The inverter 58 is composed of switching elements 58a to 58d and may be switched under control of the control means 60 which in turn is composed of a function generator 68, a pulse width control circuit 66 and a phase inverter 64.

Figure 6:
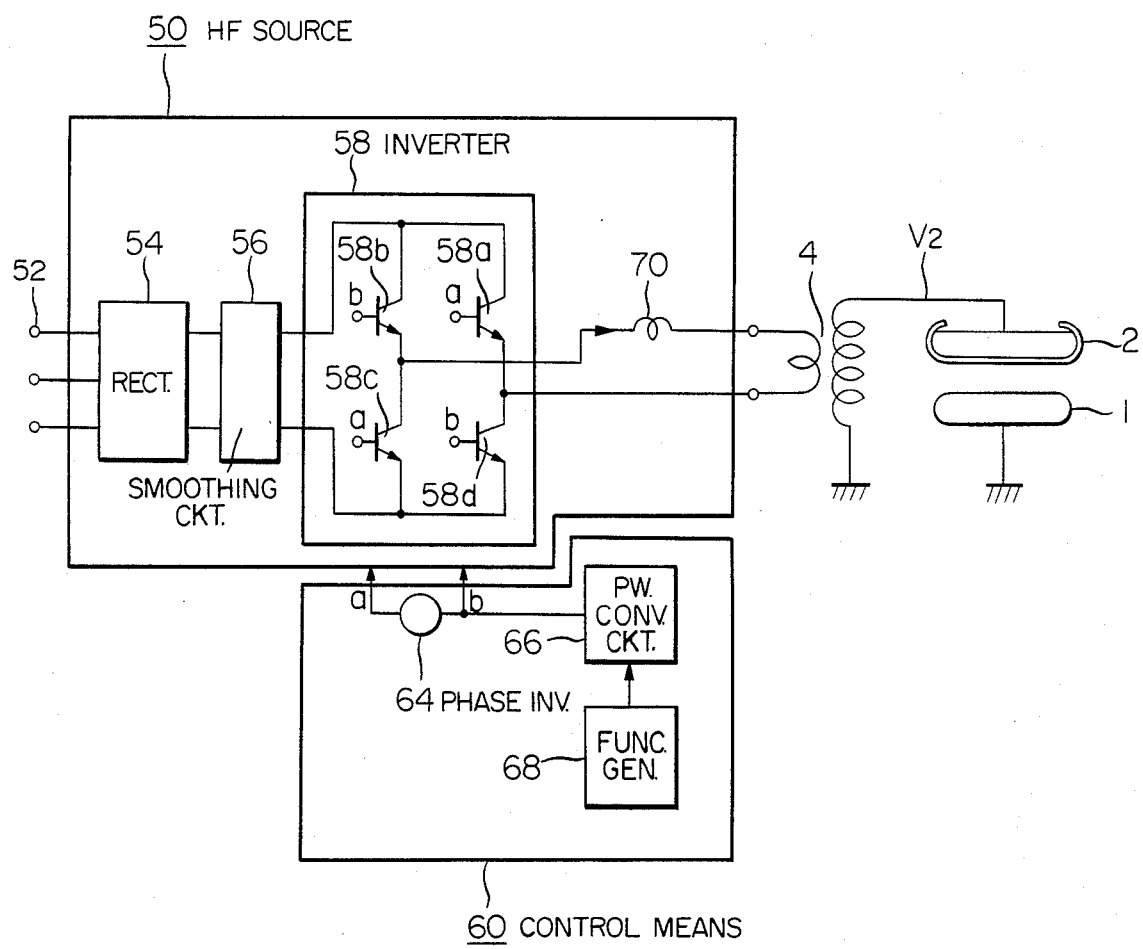
FIG. 6 is a schematic view showing the construction of the silent discharge type pulse laser embodying the present invention.

The circuit shown in FIG. 6 operates as follows. A rectangular signal shown in FIG. 7(a) is output from the function generator 68 of control means 60. This signal has different voltage values for the periods T1 and T2. The output voltage from this function generator 68 is input to the pulse width control circuit 66 which then provides an output signal shown in FIG. 7(b). Thus, the circuit 60 generates a series of pulses at a silent discharge period T0 with pulse widths being changed in dependence upon the output voltage from the function generator 68. The output signal from pulse width control circuit 66 is applied the gates of switching elements 58a to 58d of the inverter 58 either per se or after phase inversion by the phase inverter 64. The output current and voltage from the high frequency source 50 is now in the form respectively shown in FIGS. 7(c) and (d). The inverter 58 acts as a constant current source and the high frequency voltage as shown in FIG. 4(a) is now applied across the metallic electrode 1 and the dielectric electrode 2.

When it is desired to render the envelope of the high frequency voltage sinusoidal, the signal shown in FIG. 7(e) may be output from the function generator 68. Transistors, thyristors, vacuum tubes or the like may be used as the switching elements 58a to 58d forming the inverter 58.

According to the present invention, as mentioned above, the voltage applied to the silent discharge section of the pulse laser is selected to have a period larger than the period for the silent discharge and a peak value for a fraction of said period sufficient to cause discharge but insufficient to excite a laser oscillation. Hence, the pulse laser output is stable for an extremely long time and has a higher amplitude and fast build up with extremely small changes in the mean output with the passage of time.

What is claimed is:

1. A silent discharge type pulse laser device, comprising:
    a pair of opposing electrodes, at least one of which is an electrode with a dielectric cover thereon, said pair of electrodes having a silent discharge section therebetween;
    a laser resonator consisting of a total reflection mirror and a partial reflection mirror mounted opposite to each other with said silent discharge section in between;
    a source of high frequency voltage for supplying to said pair of electrodes a high frequency voltage having a predetermined period for silent discharge;
    and a control means for controlling said high frequency voltage from said source with respect to a first interval and a second interval that form a period which is longer than said period for silent discharge;
    wherein said high frequency voltage being supplied to said silent discharge section across said pair of electrodes is at a first peak voltage value during said first interval and at a second peak voltage value during said second interval, said first peak voltage value being sufficient to excite laser oscillation and said second peak voltage value being sufficient to cause a discharge but insufficient to excite laser oscillation.

2. A device as claimed in claim 1, wherein said high frequency voltage supplied from said source of high frequency voltage is supplied to said pair of electrodes through a transformer.

3. A device as claimed in claim 2, wherein said high frequency source includes an inverter.

4. A device as claimed in claim 3, wherein said control means comprises a pulse width control circuit for controlling said inverter and a function generator for controlling said pulse width control circuit.

5. A device as claimed in claim 4, wherein an output signal from said function generator is rectangular and an envelope of said high voltage supplied to said silent discharge section is rectangular.

6. A device as claimed in claim 4, wherein an output signal from said function generator is sinusoidal and an envelope of said high voltage supplied to said silent discharge section is sinusoidal.

7. A device as claimed in claim 4, wherein said first and second intervals are equal in duration.

8. A device as claimed in claim 7, wherein said second peak voltage value is less than 3.8 kV.

* * * * *